United States Patent

[11] 3,532,197

| [72] | Inventor | Donald J. King<br>Huron, Ohio |
|---|---|---|
| [21] | Appl. No. | 802,933 |
| [22] | Filed | Feb. 27, 1969 |
| [45] | Patented | Oct. 6, 1970 |
| [73] | Assignee | General Motors Corporation<br>Detroit, Michigan<br>a corporation of Delaware |

[54] ONE-WAY BAND CLUTCH
7 Claims, 3 Drawing Figs.
[52] U.S. Cl. .................................................. 192/41,
192/81, 267/1
[51] Int. Cl. .................................................. F16d 13/08,
F16d 41/20

[50] Field of Search.............................................. 192/41(S),
56(C), 81; 267/1, 115

[56]  References Cited
UNITED STATES PATENTS
| 2,112,425 | 3/1938 | Nixon..................... | 267/1.5 |
| 3,193,067 | 7/1965 | Dodwell................. | 192/41(S)UX |
| 3,275,111 | 9/1966 | Lang et. al.............. | 192/41(S)UX |

Primary Examiner—Allan D. Herrmann
Attorneys—Warren E. Finken and F. J. Fodale

ABSTRACT: A band-type one-way clutch has two bights in each band of a plurality of nested bands. The end bight in each band is received in a recess in the outer race. The other bight is nested in the end bight in an adjacent band reinforcing the attachment points of the bands and indexing the adjacent bands with respect to each other.

Patented Oct. 6, 1970

3,532,197

INVENTOR.
Donald J. King

BY

F. J. Fodale
ATTORNEY 3,532,197

1

ONE-WAY BAND CLUTCH

My invention relates generally to one-way clutches and more specifically to a one-way clutch having a plurality of nested bands, the plurality of nested bands so used and a band for use in the plurality of nested bands.

Band-type clutches in which a plurality of spiral-shaped bands keyed to one of the races clutch the other race in one direction and overrun it in the other direction have heretofore been known. See the U.S. Pat. to Dodwell No. 2,518,453. My invention is directed toward this general type of clutch and the object of my invention is to improve generally upon the clutch shown in the aforementioned patent.

In one of its broadest aspects, the object of my invention is to provide such a clutch in which the attachment of the bands to one of the clutch races is provided simply and efficiently.

Another object of my invention is to provide a band for use in a band clutch in which an integral part of the band which requires no brazing, soldering, welding, inserts or other similar reinforcing schemes is formed for attachment to a recess in one of the races with no mechanical connection between the band and the race being required.

Another object of my invention is to provide a band clutch having a plurality of bands in which the portion of the bands which receives the torque from the race is stronger than bands heretofore known which do not use brazing, soldering, welding, inserts or similar schemes to reinforce the band attachment.

In another of its broadest aspects, the object of my invention is to provide a band-type clutch having a plurality of bands in which the bands are nested and correctly oriented for ease of assembly to one of the clutch races.

Another object of my invention is to provide a band-type clutch having a plurality of bands in which the bands are nested and correctly oriented for ease of assembly to one of the clutch races and in which the portion of the bands which receives the torque from the race is stronger than bands heretofore known which do not use brazing, soldering, welding, inserts or similar schemes to reinforce the band attachment.

The exact nature of this invention as well as other objects and advantages thereof will be readily apparent from consideration of the following specification relating to the annexed drawing in which.

Figure 1:
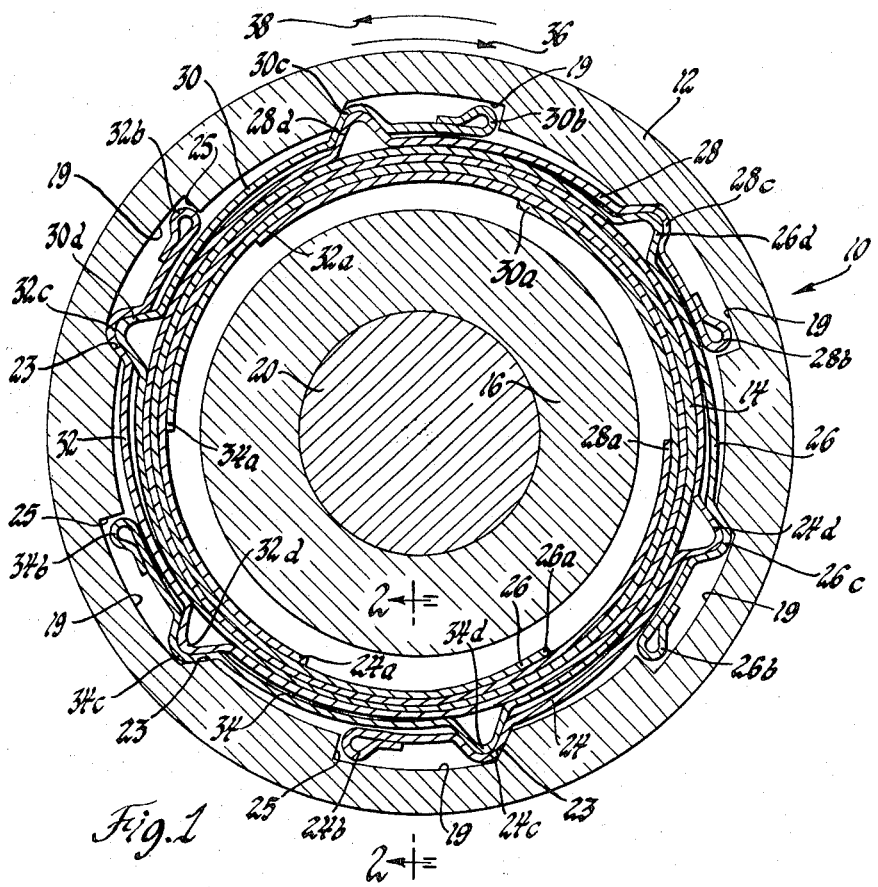
FIG. 1 is an elevation in section of a band clutch in accordance with my invention.
Figure 2:
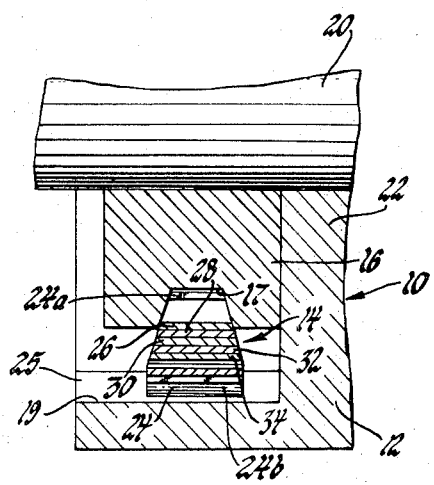
FIG. 2 is a section taken along the line 2–2 of FIG. 1 and looking in the direction of the arrows.

Referring now to the drawings and more particularly to FIG. 1, the one-way band-type clutch is indicated at 10 and comprises an outer race 12, a nest of bands 14 and an inner race 16 fixedly mounted on a shaft 20, for instance, by a press fit. A radial shoulder 22 on the outer race 12 is journaled on the shaft 20 to concentrically locate the outer race 12 with respect to the inner race 16 and to allow relative rotation between the two races. This is best seen in FIG. 2 which also shows that the inner race 16 includes a V-groove 17.

Returning to FIG. 1, the outer race 12 includes a number of circumferentially spaced peripheral recesses 19 which receive one end of the bands in the band nest 14. The other or tail end of the bands are disposed in the V-groove 17 in the inner race 16.

Figure 3:
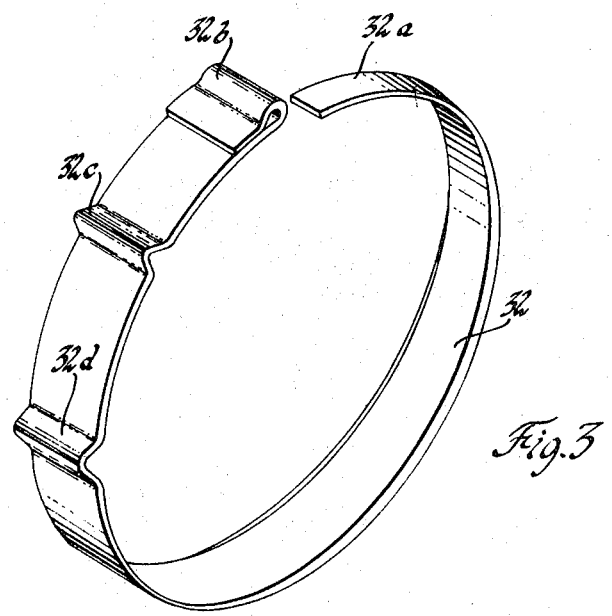
FIG. 3 is a perspective view of a typical band shown in FIGS. 1 and 2.

In the particular embodiment shown, the nest of bands 14 consists of six individual bands 24, 26, 28, 30, 32, and 34. A typical band, such as band 32, is shown in perspective in FIG. 3. It comprises a thin strip of steel curved to a generally spiral shape and spring tempered. The tail portion 32a of the band is tapered for progressively deeper penetration into the V-groove 17 in the inner race 16. In actual practice in a six band configuration, the tail portion which would be disposed in the V-groove comprises about the last ninety degrees of the band.

2

The attachment end of the band terminates in a reverse fold 32b which forms an open loop portion and continues with a portion which overlies the band itself. The open loop portion provides a reaction surface for the outer race 12 which will hereinafter be more fully explained. The reverse fold as described is sufficient to sustain the forces transmitted to it and the brazing or otherwise securing the overlying portions of the fold is not required.

The portion of the band adjacent the fold 32b includes two somewhat triangular bights 32c and 32d integrally formed in the band. The remaining bands correspond to band 32 and like parts have been coded to the band 32 by using the same identifying letters together with the numerical identification for the band, i.e., the reverse fold for band 34 is identified as 34a. The spacing and dimension of the various bights of the bands are best understood in connection with FIG. 1.

The six circumferentially spaced peripheral recesses 19 in the outer race 12 open radially toward the inner race 16. Each recess 19 receives the attachment end of one of the bands comprising the reversely-folded terminal end and the first bight. For instance, one of the recesses 19 receives the terminal end 32b and bight 32c of the band 32. The recess 19 includes a generally radial force transmitting wall 23. The bight 32c has a face engaging the wall 23 which is angularly related to a radial line of the clutch so that a radially inwardly component of force acts on the bands in the torque transmission to the bands. This force aids in coiling the band 32 and wedging the free ends 32a into the V-groove 17. The recess 19 also includes a generally radial abutment wall 25 which cooperates with the terminal or looped end 32b of the band in declutching. The next recess 19 in the counterclockwise direction similarly includes a force transmitting wall 23 and abutment wall 25 which cooperates with the bight 34C and terminal end 34b of the band 34, respectively. The next recess 19 receives the attachment end of the band 24 and so on.

The second bight 32d on band 32 is nested in the first bight 34c of the band 34. This relationship is repeated in each successive band, that is, the second bight 34d of band 34 is nested in the first bight of the next band 24c and so on. In previously used bands which only a single bight or single thickness of metal was used, the type of failure which the bands most often encountered resulted from shearing through the bight somewhere along its face which contacted the wall 23. Thus the nesting of a second bight offers a double thickness of metal in this area hence increasing the shear capacity of the bands resulting in a clutch capable of sustaining higher loads. Another feature realized with the nesting of bight 32d into bight 34c and the similar nesting of the rest of the bights is that the bights 32c, 34c, 24c, 26c, 28c, and 30c are automatically correctly oriented in the band pack 14 and the pack or nest of bands 14 are adapted for ease of assembly into the recesses 19 in the outer race 12. In connection with the orientation or indexing of the bands, it is mandatory that the second bight on each band be similar to the first bight on an adjacent band, in this particular instance, triangular, so that the bands are located in both directions with respect to each other. It is also preferable to have a tight nesting, i.e., the radial inner dimension of the bight 34c is substantially equal to the radially outer dimensioning and shape of the bight 32d.

As illustrated in FIG. 1, the nest of bands 14 lock the races in response to relative rotation between the races in the clockwise direction 36 and allow freewheeling in the opposite direction 38.

The clutch is assembled by first forming the nest of bands 14 from the individual bands 24, 26, 28, 30, 32, and 34. As heretofore mentioned, the band nest 14 will have the individual bands correctly oriented by virtue of the nesting of the second bight into the end bight of an adjacent band, as for instance, the bight 30d of band 30 being nested in the bight 32c of the band 32. The band nest 14 is then assembled to the inner race 16. The bands in the band nest 14 are sufficiently resilient so that they can be uncoiled in the nest to move their radially inner ends outwardly to pass over the shoulder and into the V-groove 17 in the inner race 16. With the band nest 14 assembled to the inner race 16 and the attachment ends of the bands correctly oriented, this subassembly is completed by moving the outer race 12 axially onto the subassembly with the recesses 19 receiving the attachment ends of the bands by virtue of the recesses 19 being open at the left ends as shown in FIG. 2.

While I have illustrated a clutch using six bands with two bights in each band, it is to be understood that both the number of bands may be varied or that the number of bights per band may be increased without departing from the spirit of my invention. Of course, the spacing between bights on a single band must be such so as to nest in the bights of the other bands with the bights in each band spaced closest to the terminal end of the band being correctly spaced for receipt into the recesses of the outer race.

I claim:

1. a clutch comprising:
   a first member;
   a second member surrounding said first member and substantially coaxial therewith;
   a plurality of evenly circumferentially spaced peripheral recesses in said second member opening toward said first member;
   a generally radial torque transmitting wall in each of said recesses;
   a generally radial abutment wall in each of said recesses;
   a spiral-shaped spring band for each of said recesses having one end disposed in said recesses and the other end engaging said first member, said one end including a first bight having a surface engaging said generally radial torque transmitting wall whereby said band is coiled into wedging engagement with said first member in response to relative rotation between said members in a first direction;
   said one end further including a reaction surface spaced from said first bight, said generally radial abutment wall engaging said reaction surface in response to relative rotation between members in the opposite direction whereby said band is uncoiled into slipping engagement with said first member; and
   each of said bands including a second bight spaced from said first bight and nested in the first bight in an adjacent band whereby torque is transmitted from each of said torque transmitting surfaces to at least two of said bands.

2. The clutch as defined in claim 1 wherein said first and second bights are similarly shaped as so dimensioned so that the outer surfaces of said second bights are substantially identical to the inner surfaces of said first bights whereby said plurality of nested spiral-shaped bands have their bights correctly oriented for ease of assembly into said recesses of said second member.

3. A clutch comprising:
   a first member;
   a second member substantially coaxial with said first member;
   a plurality of circumferentially spaced peripheral recesses in said second member, said recesses opening radially toward said first member; and
   a plurality of nested spiral-shaped bands attached at one end to said second member with their other ends engaging said first member,
   each of said bands having a plurality of spaced bights adjacent said one end, one of said bights on each of said bands being disposed in one of said recesses and another of said bights on each of said bands being nested in a bight on another of said bands.

4. The clutch as defined in claim 3 wherein said recesses include a generally radial torque transmitting wall and a generally radial abutment wall,
   and wherein said one bight includes a surface abutting said torque transmitting wall,
   and wherein said another bight is nested in said one bight whereby torque is transmitted from said radial torque transmitting wall to at least two of said bands,
   and wherein each of said bands further includes a reaction surface at said one end of said band of the side of said one bight opposite said other bight,
   said reaction surface being engageable by said abutment wall to uncoil said bands to release said first member.

5. A plurality of nested spiral-shaped bands for use in a clutch comprising:
   a number of bands precurved to a spiral shape, each of said bands having a first portion and a second portion,
   said bands being nested so that said second portion on each band is overlapped by an adjacent band;
   a first bight in the first portion of each of said bands; and
   a second bight in the second portion of each of said bands, said second bight being nested in the first bight of said adjacent band whereby said first bights in said bands are correctly oriented for assembly to a member having a plurality of radially open peripheral recesses adapted to receive said bights.

6. The plurality of nested bands as defined in claim 5 wherein said first and second bights are triangular in shape as so dimensioned so that the outer surfaces of said second bights are substantially identical to the inner surfaces of said first bights whereby said plurality of nested spiral-shaped bands have their bights correctly oriented for ease of assembly into said recesses of said second member.

7. A band for a one-way band clutch comprising:
   an elongated thin spring metal strip precurved into a spiral shape;
   a reverse fold at one end of said band; and
   a plurality of integral, spaced, similarly-shaped bights in said band adjacent said one end.
   said bights successively decreasing in size from said one end so that a bight is nestable in the bight next closest to said one end.